(12) United States Patent
Newell et al.

(10) Patent No.: US 6,354,384 B1
(45) Date of Patent: Mar. 12, 2002

(54) SURFACE EFFECT DRILLING CRAFT FOR OBTAINING CONTINUOUS CORE SAMPLES

(75) Inventors: Wayne Linwood Newell, Leesburg; Donald Garrett Queen, Round Hill, both of VA (US); Hubert Browning Firminger, St. Joseph, MI (US); Hugh John Scott, Wellington; John Andrew Clarke, Picton, both of (CA)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/598,796

(22) Filed: Jun. 21, 2000

(51) Int. Cl.$^7$ .............................. E21B 7/02; B60V 1/104
(52) U.S. Cl. ........................ 175/5; 175/203; 405/195.1; 180/117
(58) Field of Search ................................ 175/203, 5, 9, 175/18; 166/352; 205/195.1, 203; 180/117, 127

(56) References Cited

U.S. PATENT DOCUMENTS

| 3,853,349 A | * | 12/1974 | Moore | 296/189 |
| 4,073,144 A | * | 2/1978 | Lea | 405/61 |
| 4,718,501 A | * | 1/1988 | Lawler | 180/117 |
| 6,200,069 B1 | * | 3/2001 | Miller | 405/196 |

* cited by examiner

Primary Examiner—Frank Tsay
(74) Attorney, Agent, or Firm—Ross F. Hunt, Jr.

(57) ABSTRACT

A surface effect drilling craft or hovercraft is provided for taking continuous core samples in normally inaccessible environmentally sensitive regions such as wetlands. The hovercraft includes an inner hull including an inner hull floor and a bottom hull disposed beneath the inner hull and a base mounting plate secured to the inner hull floor. A drill tube extends through the base mounting plate, inner hull floor and bottom hull. A drill rig including a multi-sonic drill is mounted on the base mounting plate adjacent to the drill tube. The drill rig includes a fixed lower section, and a pivotable upper section movable between an erected, operative position for drilling and a collapsed, inoperative position during maneuvering of the hovercraft. A drill cap is used to close off the drill tube during this maneuvering.

17 Claims, 2 Drawing Sheets

SURFACE EFFECT DRILLING CRAFT FOR OBTAINING CONTINUOUS CORE SAMPLES

FIELD OF THE INVENTION

The present invention relates to devices for obtaining continuous core samples for use in environmental research and analysis and other purposes and, more particularly, to a surface effect drilling craft for, among other uses, recovering such core samples from inaccessible environmentally sensitive, shallow wetlands.

BACKGROUND OF THE INVENTION

Obtaining continuous core samples at strategic locations is essential to modern estuary and shallow lake margin studies. For this purpose, rotary coring tools, gravity or piston cores, and vibracore tools have been mounted on barges, pontoon boats and other displacement craft. The access of such a craft or vessel to intertidal zones is limited by the draft of the vessel and the timing of the tidal cycle. Coring tools have also been mounted on wheeled or tracked vehicles but such platforms cannot traverse roadless wetlands without damaging the ecosystem or its substrate. As a result of this, the very environments that receive and store modern sediments are inaccessible to research that depends on vertical sampling to provide the history of, and further data regarding, nutrient, sediment and contaminant flux from the land into ponds and estuaries. Moreover, conventional coring technology presents additional limitations for work in the wetlands. Rotary coring uses fluids and additives, and produces large amounts of cuttings that can contaminate the ecosystem. Gravity or piston coring devices and small vibracore tools are limited by materials that can impede penetration making it impossible, as a practical matter, to sample entire stratigraphic intervals that have been targeted for research.

SUMMARY OF THE INVENTION

In accordance with the invention, a surface effect drilling craft is provided which, among other uses, enables recovery of continuous core samples in normally inaccessible, environmentally sensitive areas. The surface effect craft or hovercraft can negotiate shallow water, mud flats, marshes, beaches and firm ground without tracking or damaging the ecosystem. In a preferred embodiment, a multi-sonic drill is mounted on the hovercraft and such a drill can penetrate and recover cores up to 30 meters in length, through materials of variable resistance, without the use of fluids No cuttings are produced and the environment around the drill site is not otherwise defiled or polluted. The cores provide the data necessary to document the history of the ecosystem in changing environments that have been previously inaccessible.

In accordance with the invention, a surface effect drilling craft is provided comprising: a hovercraft including an inner hull floor and a bottom hull disposed beneath the inner hull; a base mounting plate secured to the inner hull floor; a drill tube having an upper end and a lower end and extending through the base mounting plate, inner hull floor and bottom hull; a drill cap for, in use, closing off the drill tube during maneuvering of the hovercraft; and a drill rig mounted on the base mounting plate adjacent to the drill tube, the drill rig including a fixed lower section, and a pivotable upper section movable between an erected, operative position and a collapsed, inoperative position.

Preferably, as indicated above, the drill rig includes a multi-sonic drill for, e.g., taking continuous core samples. As set forth hereinbefore, a multi-sonic drill provides important advantages over other drilling devices.

The hovercraft has a balance point and the drill tube is located at the balance point to assist in providing proper trim. Advantageously, the drill rig is located on the hovercraft forward of the drill tube.

A support member is preferably provided for supporting the upper section of the drill rig in the inoperative position of the latter. The support member advantageously comprises a support crutch located on the hovercraft forward of the drill tube.

The hovercraft includes a buoyancy wall having an upper end and the upper end of the drill tube is preferably located below the upper end of said buoyancy wall.

Preferably, a special support means is provided for supporting the inner hull floor. Advantageously, the support means includes a plurality of vertical support elements extending between the inner hull floor and the bottom hull. The support elements preferably comprise stringers affixed to the bottom hull and connected by support angles to the inner hull floor.

More generally, support angles are preferably connected to the inner hull floor to provide strengthening thereof. The support angles are advantageously connected to the inner hull floor by bolts which also secure the base mounting plate in place.

Preferably, the hovercraft further comprises sealing means for providing an air and water seal between the drill tube and the bottom hull. The sealing means advantageously comprises a fiberglass resin seal.

Preferably, the hovercraft further comprises sealing means for providing an air seal between the drill tube and the inner hull floor. Advantageously, the air sealing means comprises a rubber seal.

Advantageously, the lower end of the drill tube projects below the bottom hull, and the hovercraft further comprises a protective member secured to the bottom hull for protecting the lower end of the drill tube from impact.

Further features and advantages of the present invention will be set forth in, or apparent from, the detailed description of preferred embodiments thereof which follows.

DESCRIPTION OF THE PREFERRED EMBODIMENTS

Figure 1:
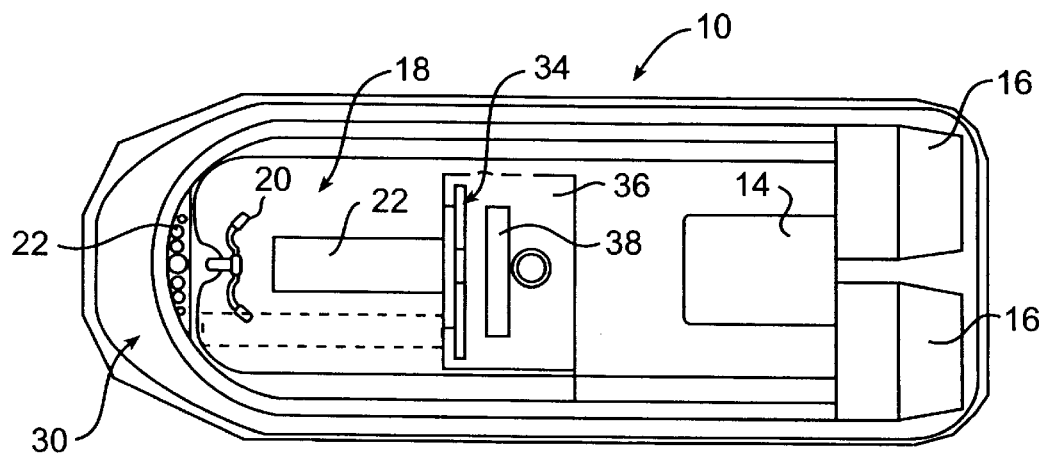
FIG. 1 is a schematic top plan view of a surface effect drilling craft constructed in accordance with the present invention, with parts removed for illustrative purposes.
Figure 2:
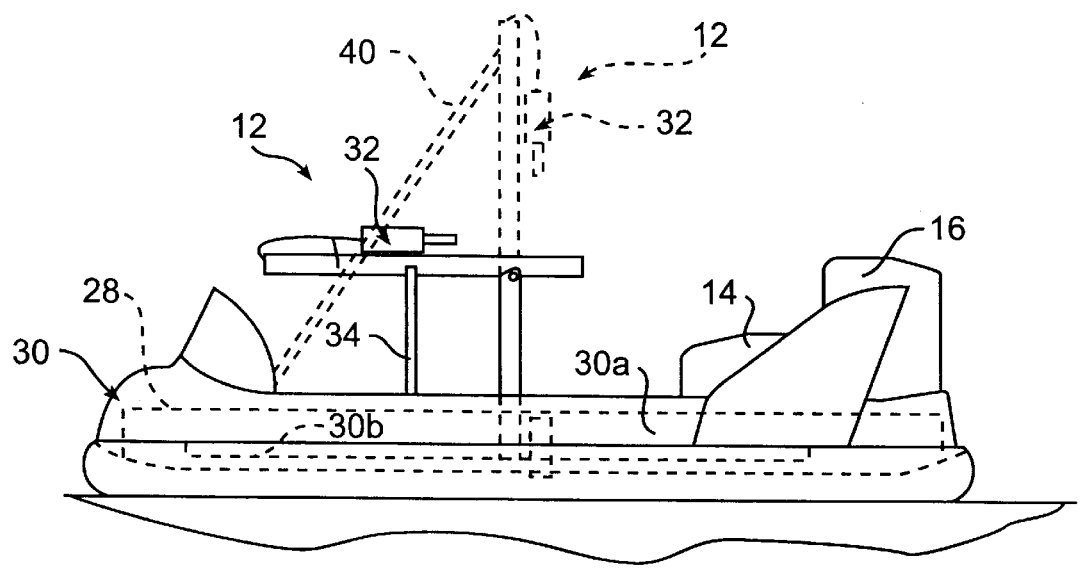
FIG. 2 is a schematic side elevational view of the craft of FIG. 1 showing the drill rig.
Figure 3:
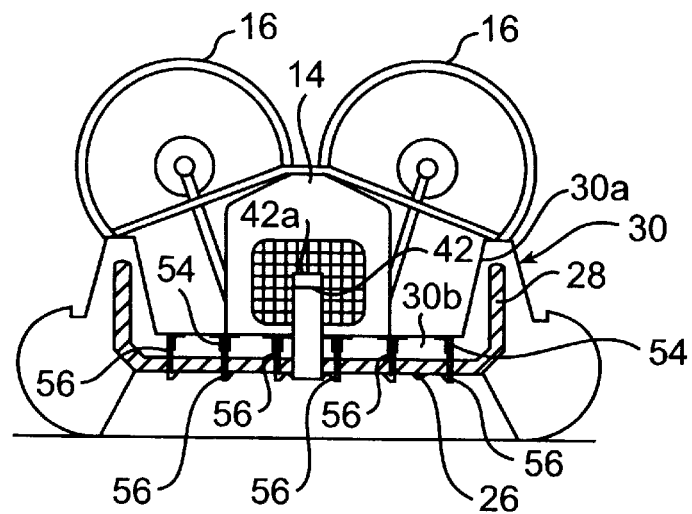
FIG. 3 is a schematic front elevational view of the craft of FIG. 1 showing the inner hull floor reinforcement.

Referring to FIGS. 1 to 3, there is shown a surface effect vehicle or craft, i.e., a hovercraft, 10 incorporating a coring drill assembly 12 (see FIG. 2). Apart from important adaptations discussed below, the hovercraft 10 is conventional and includes a turbine or other drive unit 14 which drives a pair of fans 16 located at the stem thereof. As can best be seen in FIG. 1, a cockpit area 18 includes a steering unit 20 and a control panel 22, as well as a box seat 24. As is perhaps best seen in FIG. 3, a bottom hull 26 is affixed to or formed integrally with a buoyancy dam 28, while an inner hull 30, disposed above bottom hull 26 is spaced relative thereto, includes side walls 30a of an inverted "vee" shape in transverse cross section and a bottom floor or inner hull floor 30b. It is again to be understood that the hovercraft 10 as described so far is basically conventional and that the present invention is not limited to the specific hovercraft illustrated.

As shown in FIG. 2, drill assembly 12 includes a drill rig 32 having a lower section 32a affixed to the deck of a hovercraft 10 in a manner described in more detail below and an upper section 32b pivotably or rotatably connected to lower section 32a so as to be movable between a rest or inoperative position shown in solid lines and an erected or operative position shown in dashed lines. A crutch 34 for upper section 32b (see also FIG. 1) is also affixed to the deck of hovercraft 10. More particularly, both lower section 32a and crutch 34 are supported on a base mounting plate 36 (see FIG. 1), the former through means of a drill rig support structure 38 indicated schematically in FIG. 1. As shown in FIG. 2, a pair of support struts (one of which, denoted 40, is shown in FIG. 2) may be used to support drill rig 32 in the erected state thereof.

A drill tube or drill pipe 42 which is described in more detail below, extends through base mounting plate 36, inner hull floor 30b and bottom hull 26 to a position just below bottom hull 26. A cap 42a is used to close off drill tube 42 when the latter is not being used. In particular, cap 42 is employed during maneuvering operations of the hovercraft 10 so as not to affect the air cushion beneath the hovercraft 10. As shown in FIG. 3, drill tube 42 is preferably less than the height of the buoyancy dam 28 so as to provide a measure of safety when retrieving the drill string or pipe when the hovercraft 10 is waterborne.

As shown in FIG. 2, drill assembly 12 includes a drill rig 32 which is affixed to a cable or the like 32b so to permit lowering drill rig 32 through drill tube 42. Drill rig 32 includes a drill pipe string and is mounted on a mast which is the two section construction described above 32a, 32b. It will be understood that drill rig 32 is conventional and preferably comprises a multi-sonic drill sold under the name MetaDrill™, by MPI Drilling of Ontario, Canada. Reference is made to U.S. Pat. Nos. 5,004,055 and 5,058,688 and U.S. patent application Ser. No. 09/220,370, for a description of drills of this or a related type. It noted light weight alloys should be used in making the mast and the mast supporting structure 38 as the hydraulic circuit (not shown) for the drill rig 32.

In common with other hovercraft, the hovercraft 10 is capable of travelling over land, ice, shallow water, areas of sand and mud, open rivers and sea with waves up to two foot (60 cms) high. Hovercraft 10 is designed to carry two persons and drill rig assembly 12. The hovercraft 10 is designed to have sufficient buoyancy to carry this payload under these conditions as well as to overcome the downward pressure exerted on the hovercraft 10 when the drill pipe string 32c is withdrawn from the ground.

The drill rig 32 is positioned centrally of the craft 10, as shown, and the overall arrangement is such as to maintain the trim of the craft 10 while floating on water during the drilling process. In general, the drill tube 42 is located at the balance point of craft 10 and drill rig 32 is positioned in close proximity relative to drill tube 42 so as to maintain trim. The craft 10 must be sufficiently heavy to exert the necessary downwardly acting force to enable the drill string 32c to penetrate the terrain to the required depth, As shown in FIG. 1, the drill rig 32 is mounted on the base plate 36, which is preferably made of thick aluminum, and located forward of the drill tube 42 along with the gasoline engine (not shown) for rig 32 and this arrangement is important in equalizing the trim of the craft 10 while floating.

Figure 4:
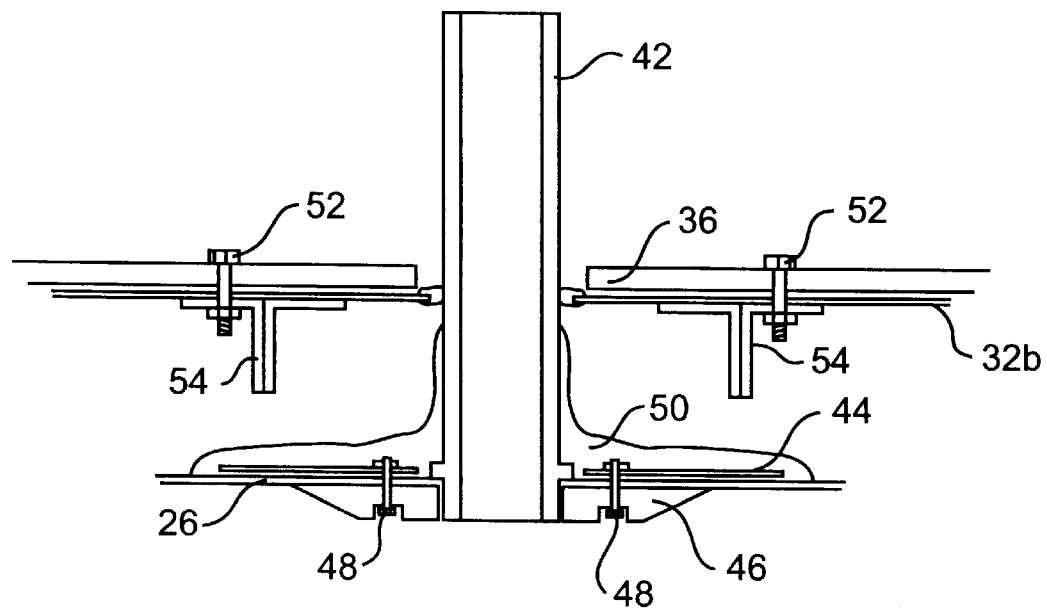
FIG. 4 is a cross-sectional view of a portion of the craft of FIG. 1 showing details of the drill tube mounting arrangement and the inner hull floor reinforcement.

The mounting of the drill tube 42 is also important and, as shown in FIG. 4, drill tube 42 includes a lower circumferential flange 42c which abuts against bottom hull 26. A further metal reinforcement plate 44 is disposed on top of bottom hull 26 while a UHMW impact protection plate 46 is bolted to bottom hull 26 by bolts 48 which also secure plate 44 in place.

A seal member or seal 50, preferably made of fiberglass and resin, provides sealing against air and water in this area. As illustrated, base mounting plate 36 is secures to inner hull floor 30b by bolts 52 which also secure in place support angles 54 that provide drill rig support and hull reinforcement. A further, rubber air seal 55 is provided between floor 30b and drill tube 42.

As shown in FIG. 3, a plurality of vertical support elements or stringers 56, supported at the upper ends thereof by support angles 54 secured to bottom hull 25 and extending between inner hull floor 30b and bottom hull 26, are used to strengthen and support the floor 30b.

In a specific. non-limiting embodiment, for a hovercraft with a payload capability of 1,500 lbs. (680 Kg) and a tare weight of 2,500 lbs. (1,134 Kg), the floor 30b is strengthened by six 9 inch (23 cms) tall stringers 56 which are firmly secure to the bottom hull 26 and which are reinforced at the level floor 30b by aluminum 2'×2'×¼" (50×50×6.35 mm) angles 54 running the full length of the associated stringers. The floor 30b is riveted to the aluminum angles 54 on the stringers 56. Drill tube 42 is located at the center point of floor 30b along both the longitudinal and transverse or cross axis. Tube 42 preferably is made of fiberglass and resin, has an inner diameter of 6½ inches (16.5 cms) and an outer diameter of 7³⁄₁₆ inches (18.25 cms) and protrudes 1 inch (2.54 cms) from the hull bottom 26.

Although the invention has been described above in relation to preferred embodiments thereof, it will be understood by those skilled in the art that variations and modifications can be effected in these preferred embodiments without departing from the scope and spirit of the invention.

What is claimed:

1. A surface effect drilling craft comprising:
   a hovercraft including an inner hull including an inner hull floor and a bottom hull disposed beneath the inner hull;
   a base mounting plate secured to the inner hull floor;
   a drill tube having an upper end and a lower end and extending through said base mounting plate, said inner hull floor and said bottom hull;
   a drill cap for, in use, closing off said drill tube; and
   a drill rig mounted on said base mounting plate adjacent to said drill tube, said drill rig including a fixed lower section, and a pivotable upper section movable between an erected, operative position and a collapsed, inoperative position.

2. A craft according to claim 1 wherein said drill rig includes a multi-sonic drill.

3. A craft according to claim 1 wherein said hovercraft has a balance point and said drill tube is located at said balance point.

4. A craft according to claim 1 wherein said drill rig is located on said hovercraft forward of said drill tube.

5. A craft according to claim 1 further comprising a support member for supporting said upper section of said drill rig in the inoperative position thereof.

6. A craft according to claim 5 wherein said support member comprises a support crutch located on said hovercraft forward of said drill tube.

7. A craft according to claim 1 wherein said hovercraft includes a buoyancy wall having an upper end and wherein the upper end of said drill tube is located below the upper end of said buoyancy wall.

8. A craft according to claim 1 further comprising support means for supporting said inner hull floor.

9. A craft according to claim 8 wherein said support means includes a plurality of vertical support elements extending between the inner hull floor and the bottom hull.

10. A craft according to claim 9 wherein said support elements comprise stringers affixed to the bottom hull and connected by support angles to the inner hull floor.

11. A craft according to claim 1 further comprising support angles connected to the inner hull floor to provide strengthening thereof.

12. A craft according to claim 11 wherein said support angles are connected to the inner hull floor by bolts which also secure the base mounting plate in place.

13. A craft according to claim 1 further comprising sealing means for providing an air and water seal between the drill tube and the bottom hull.

14. A craft according to claim 13 wherein said sealing means comprises a fiberglass resin seal.

15. A craft according to claim 1 further comprising sealing means for providing an air seal between said drill tube and said inner hull floor.

16. A craft according to claim 15 wherein said sealing means comprises a rubber seal.

17. A craft according to claim 1 wherein the lower end of said drill tube projects below the bottom hull, said hovercraft further comprising a protective member secured to said bottom hull for protecting the lower end of said drill tube from impact.

* * * * *